United States Patent
Chopra et al.

(10) Patent No.: US 8,686,754 B2
(45) Date of Patent: Apr. 1, 2014

(54) CONFIGURABLE LANE ARCHITECTURE IN SOURCE SYNCHRONOUS SYSTEMS

(75) Inventors: Sanjeev Chopra, Jalandhar (IN); Hiten Advani, Sarita Vihar (IN)

(73) Assignee: STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 13/542,539

(22) Filed: Jul. 5, 2012

(65) Prior Publication Data
US 2014/0009633 A1 Jan. 9, 2014

(51) Int. Cl.
*H03K 19/177* (2006.01)
(52) U.S. Cl.
USPC .............................................. 326/40; 326/41
(58) Field of Classification Search
None
See application file for complete search history.

(56) References Cited

U.S. PATENT DOCUMENTS

| | | | |
|---|---|---|---|
| 6,192,426 B1 * | 2/2001 | Kando et al. | 710/52 |
| 2004/0230729 A1 * | 11/2004 | Ho et al. | 710/113 |
| 2006/0190780 A1 * | 8/2006 | Gower et al. | 714/718 |
| 2010/0027504 A1 * | 2/2010 | Ramamurthy et al. | 370/331 |

* cited by examiner

*Primary Examiner* — Crystal L Hammond
(74) *Attorney, Agent, or Firm* — Graybeal Jackson LLP

(57) ABSTRACT

A system and method for utilizing multiple configurable lanes for clock and data transfer in source synchronous systems that may utilize a clock signal from another source for interpreting data received from the source. In an embodiment, a system may include a transmitter configured to transmit at least one clock signal and at least one data signal to a receiver device. The receiver device may have at least one clock lane and at least one data lane for receiving signals from the transmitter device. The clock lane(s) and data lane(s) can be arranged in any order as per requirement of system design. In the receiver, after manufacture, each data lane may be configured to be clocked by any clock lane.

19 Claims, 6 Drawing Sheets

CONFIGURABLE LANE ARCHITECTURE IN SOURCE SYNCHRONOUS SYSTEMS

BACKGROUND

Mobile devices and other electronic devices often have specific standards by which different circuits and components within such devices should comply. By adhering to specific standards for communications, multiple manufacturers may provide different parts of components of these devices. One such standard for mobile devices is the Mobile Industry Processor Interface (MIPI). MIPI standards provide guidance for manufacturers when designing and producing components, such as cameras, batteries, and the like, for mobile devices.

Within MIPI standards, a physical layer (PHY) may define specific interfaces between integrated circuits and physical signal-carrying mediums (e.g., the copper wire or traces between components). Thus, a circuit or device that is sending a signal may comply with transmission standards defined by a MIPI-PHY specification. Similarly, a circuit or device that is receiving a signal may also comply with receiving standards defined by a MIPI-PHY specification. Further yet, as technology for transmitting and receiving signals improves, additional definitions within these standards also develop. One such additional definition in a differential signal physical layer standard (D-PHY).

With such standards in place, a need arises for manufacturing integrated circuits for use within mobile devices that are flexible and configurable yet still are able to comply with MIPI D-PHY standards.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method for having multiple configurable lanes for clock and data transfer in source synchronous systems that may utilize a clock signal from another source for interpreting data received from the source. In an embodiment, a system may include a transmitter configured to transmit one or more clock signals and one or more data signals to a receiver device. The receiver device may have multiple lanes for receiving signals from the transmitter device. Therefore, any data lane may be configured after manufacture to receive a clock signal from any one of the receiver clock lanes such that any data lane may be clocked from any of the clock lanes.

A receiver device manufactured according to embodiments described above may then be configured in the field for any desired use by a customer. Thus, one receiver device may be manufactured with multiple lanes for receiving signals and then configured in the field for the customer's specific requirements for data lanes and clock lanes. Such a lane configurable device is advantageous for its configurability as well as having critical paths that may affect skew rate impacted at a minimal level. These advantages and other advantages are discussed in greater detail below with respect to FIGS. 1-5.

Figure 1:
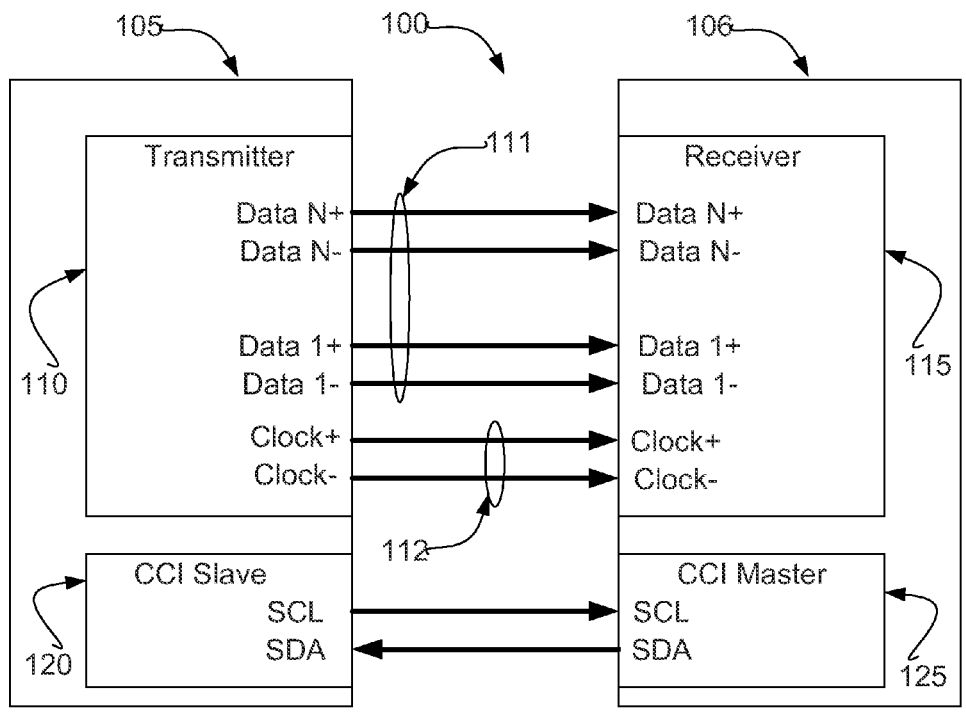
FIG. 1 is a block diagram of a circuit having an interface between a transmitting device and a receiving device having data lanes and a clock lane according to an embodiment of the subject matter disclosed herein.

FIG. 1 is a block diagram of a circuit 100 having an interface between a transmitting device 105 and a receiving device 106 having data lanes and a clock lane according to an embodiment of the subject matter disclosed herein. In this high-level block diagram, two devices are shown as a transmitter device 105 and a receiver device 106. The transmitter device 105 and the receiver device 106 may be individual devices having separate internal circuitry or may be integrated circuits disposed on one or more circuit dies. Further yet, these devices 105 and 106 may be coupled to a control device or controller (not shown in FIG. 1) such that the controller controls the behavior of these devices. Aspects of an overall system that may include these devices 105 and 106 as well as a controller (not shown) are discussed in greater detail below with regard to FIG. 6.

The transmitter device 105 may include circuitry and software for processing signals to be transmitted to another device (such as receiver device 106). Thus, once signals are ready to be transmitted, a transmitter 110 within the transmitter device 105 may send data signals and clock signals on various transmission channels 111 and 112 that may be coupled to the receiver device 106. The transmission channels 111 and 112 may be wired signals paths, wire traces on a printed circuit board, or signal paths within an integrated circuit chip. As is common in the industry, one may refer to the portion of the transmission channel that is still part of the transmitter 110 (e.g., not yet off-chip) as a lane. Thus, a data signal path may also be referred to as a data lane and a clock signal path may also be referred to as a clock lane.

The transmission channels are unidirectional in this embodiment. For example, in the transmitter 110 of FIG. 1, several differential signal transmission channels 111 and 112 may be present. In this embodiment, N data channels are shown as Data 1+/Data 1− through Data N+/Data N− (wherein the + and the − signs indicate a respective one of differential signal transmission paths 111). In one embodiment, there may be four data signal paths in the transmitter 110.

Further, in systems that are known as source-synchronous systems, a clock signal may also transmitted from the transmitter 110 to the receiver device 106 so that the receiver device 106 may properly interpret transmitted data signals on the data signal paths. Thus, in this embodiment, one differential clock signal Clock+/Clock− is also transmitted on a differential clock signal path 112. In other embodiments, more than one clock signal path 112 may be present as discussed below.

Further yet, the transmitter device 105 may also include a command and control interface (CCI) 120 for transmitting (SCL—Serial Clock) and receiving (SDA—Serial Data) control data such that the transmitter device 105 and the receiver device 106 may interact.

Similar to the transmitter device 105, the receiver device 106 may also include circuitry and software for processing signals to be received from another device (such as transmitter device 105). When signals are transmitted, a receiver 115 within the receiver device 106 may receive data signals and clock signals on the transmission channels 111 and 112. As before, in this embodiment, N data channels are shown as Data 1+/Data 1− through Data N+/Data N−. Further, the clock signal Clock+/Clock− may also be received at the receiver device 106 so that the receiver device 106 may properly interpret transmitted data signals on the data signal paths 111. Also similarly, the various signal paths may be referred to as lanes when discussing the portion of the path within the receiver 115.

Further yet, the receiver device 106 may also include a CCI 125 for receiving and transmitting control signals SCL and SDA such that the transmitter device 105 and the receiver device 106 may interact with a master/slave configuration.

In the embodiment shown in FIG. 1, the overall circuit 100 may be within a mobile device, such as a smart phone or other similar mobile device. As such, the mobile device may be subject to standards defined by MIPI DPHY. One common standard for defining the signal paths 111 and 112 call for one or more differential data signal paths and one differential clock signal path. Other standards exist, however, there are currently no specific standards within MIPI DPHY that specify any manner of using more than one differential clock signal path 112. As discussed below, several advantages may be gained by having more than one differential clock signal transmitted from the transmitter 110 to the receiver 115. Further and as also discussed below, additional advantages may be gained by providing a receiver device 106 having configurable lanes such that any data lane may be clocked by any clock lane depending upon use. A similar concept may also be applied to a transmitter device, but for the purposes of the remainder of this discussion, only the receiver aspects will be addressed.

An additional measure within the MIPI DPHY standards calls for timing compliance with maximum skew rates when transmitting and receiving data signals from one device/chip to another. That is, signals that are transmitted and received should meet a standard whereby such signal do not deviate more than a specific amount of time from an expected time for interpreting a signal in the context of serial communication. This skew rate standard is discussed further with respect to FIG. 2 and FIG. 3.

Figure 2:
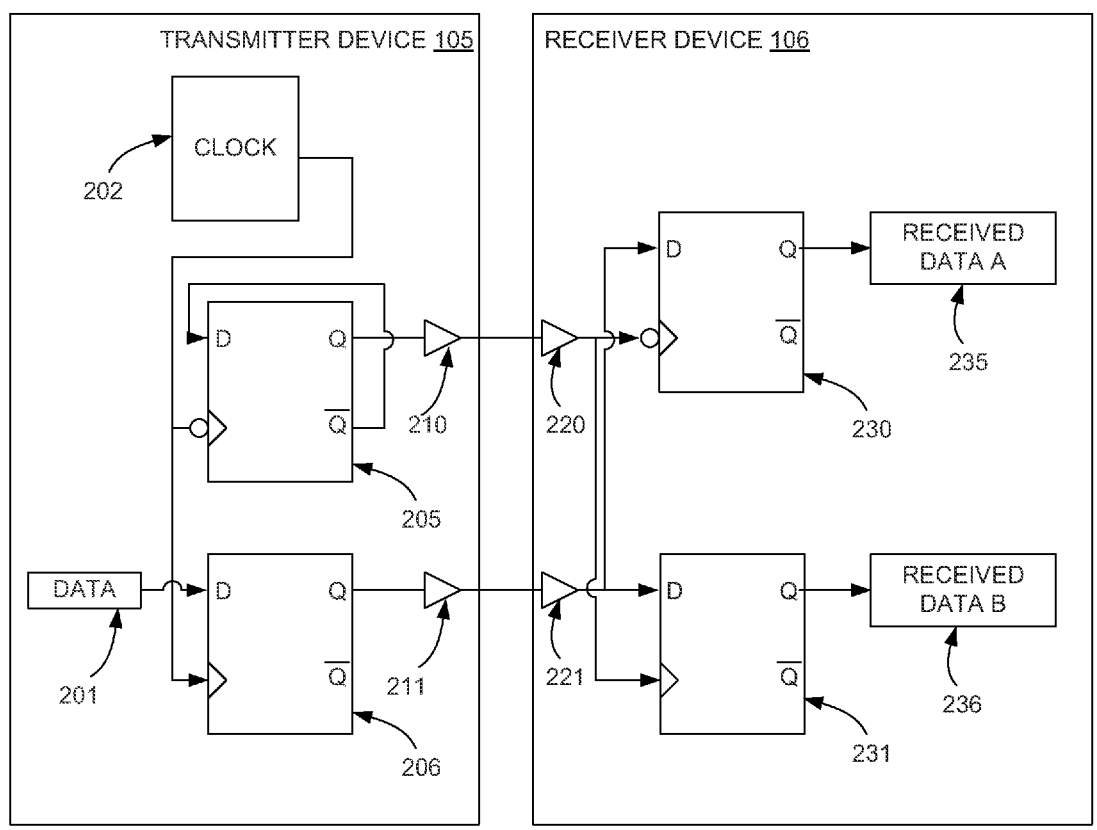
FIG. 2 is a timing diagram that illustrates the concept of clock timing compliance for differential signals used between the transmitting device and the receiving device of FIG. 1.

FIG. 2 is a more detailed block diagram of one embodiment of the system of FIG. 1 having an interface between the transmitting device 105 and the receiving device 106. In the transmitter device 105, a master clock 202 and master data input 201 provide the basis for a clock signal and data signal to be transmitted to a receiver device 106. In source synchronous systems such as this one, the data signals and the clock signals are serially "clocked" through the transmission lanes using a pair of D-type flip-flops. Thus, the clock signal is input to the D input of a first D-type flip flop 206 and the clock signal is input to the D input of a second D-type flip flop 205.

As is known in the industry, the D-type flip-flop is widely used and known as a data or delay flip-flop. A D-type flip-flop captures the value of the D-input when a clock input detects a rising or falling edge of a clock signal. When a rising edge is detected at a normal clock input (as is shown in D-type flip flop 206 for the data signal), the value at the D input is then set as the vale on the Q output. The Q-naught output is always the opposite of the Q output. Similarly, when a falling edge is detected ay an inverted clock input (as is shown on the D-type flip flop 205 for the clock signal—note the circle at the clock input), the Q output is also set to the logic value at the D input.

In the transmitter device 105, a data signal is generated on a transmitter data lane driver 211 according to a clock rate for the master clock 202. That is, at every rising edge of the master clock 202, the value at the D input of the data flip flop 206 is clocked through to the driver 211. Similarly, a clock signal is generated on a transmitter clock driver 210 according to the clock rate of the master clock 202 as well. Additionally, because the Q-naught output of the clock flip flop 205 is coupled to its D input, a consistently rising and falling signal will be generated and clocked through to the driver 210. Thus, the data signal via driver 211 is synchronized with the clock signal via 210. If one signal deviates too far ahead of or too far behind the other, a skew occurs and the data may be interpreted incorrectly. Therefore, the architecture of the receiver 106 should ensure that components for receiving the data and clock signals are balanced to within a maximum allowable skew budget. For example, the skew budget for circuit in this embodiment is 133 picoseconds which is 0.2UI (Unit Interval) of 666.67 picoseconds Unit Interval when a data communication system is clocked at 1.5 Gbps.

As signals are transmitted, a receiver data lane driver 221 and a receiver clock lane driver 220 receive the data and clock signals, respectively. In this embodiment, the receiver device 106 includes a data lane that may receive data at a double rate through two different D-type flip flops 230 and 231. Thus, the first D-type data flip flop 231 may be clocked to receive data on its D input from a data lane driver 221 on rising edges of the clock signal since its clock input is not inverted. Similarly, the second D-type data flip flop 230 may be clocked to receive data on its D input from a data lane driver 221 on falling edges of the clock signal since its clock input is inverted. As a result, the receiver device 106 may have two different serial streams of data (A and B) per data lane.

Figure 3:
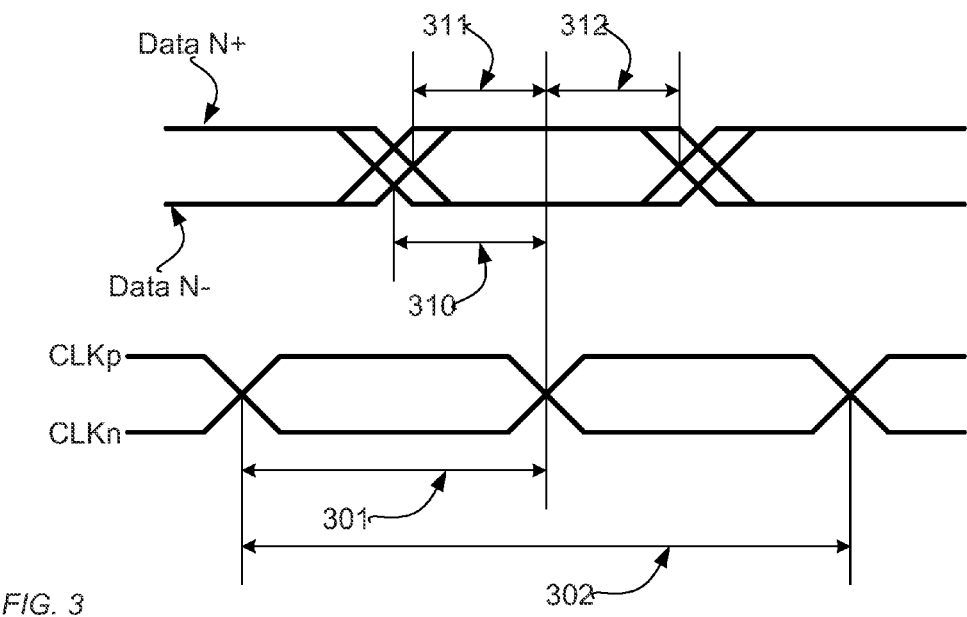
FIG. 3 is a more detailed block diagram of one embodiment of the system of FIG. 1 having an interface between the transmitting device and the receiving device with a clock interconnect and a data interconnect.

With such a double data rate, it becomes important to assure that the clock signal and the data signals do not stray too far apart from each other with respect to time. FIG. 3 is a timing diagram that illustrates the concept of clock skew timing compliance for differential signals used between the transmitting device 105 and the receiving device 106 of FIG. 1 and FIG. 2. In circuit design, clock skew (sometimes timing skew) is a phenomenon in synchronous circuits in which the clock signal (sent from the transmitter) arrives at different components at different times. This can be caused by many different things, such as wire-interconnect length, temperature variations, variation in intermediate devices, capacitive coupling, material imperfections, and differences in input capacitance on the clock inputs of devices using the clock. As the clock rate of a circuit increases, timing becomes more critical and less variation can be tolerated if the circuit is to function properly. That is, in order to correctly interpret data signals, the logical value of the data signal should be at a steady state high logic voltage or a steady state low logic voltage by the time the clock signal transitions at a rising edge that triggers a non-inverted data capture flip-flop (or falling edge in the case of an inverted flip-flop).

In the timing diagram of FIG. 3, the lower set of signals correspond to the positive CLKp and negative CLKn clock signals in a differential clock signal. With such a differential clock signal, one full period is shown at reference 302 whereas one-half period is shown as reference 301. As one expects, when the positive clock signal CLKp exhibits a rising edge, the negative clock signal CLKn exhibits a falling edge simultaneously. Likewise, when the positive clock signal CLKp exhibits a falling edge, the negative clock signal CLKn exhibits a rising edge simultaneously. Having a rising edge and a falling edge at every period on one of the two differential clock signals allows for improvements when dealing with noise, crosstalk or other factors that may lead to signal degradation.

Therefore, as data is attempted to be latched, the data signals to be read need to also be at a steady-state when the data latch is triggered. That is, if the data signal is rising or falling or has yet to change from the last intended data point, then the data latch can fail as not correctly interpreting the next bit during serial communication. The timing characteristics for data latch circuits may often be described using time measurements terms such as setup time 311 and hold time 312.

Setup time 311 is the minimum amount of time the data signal should be held steady before the clock event so that the data are reliably sampled when the clock signal triggers the data latch flip-flop. Hold time 312 is the minimum amount of time the data signal should be held steady after the clock signal triggers the data latch flip flop so that the data are reliably sampled. Synchronous data signals should be held steady for the set-up time and the hold time, where both times are relative to the clock signal. Therefore, the maximum amount that a data signal may shift away from the clock signal may be defined as the skew 310 which is shown in FIG. 3 as a time between the earliest that the Data N signal will transition, and be correctly interpreted, and the clock trigger time.

Figure 4:
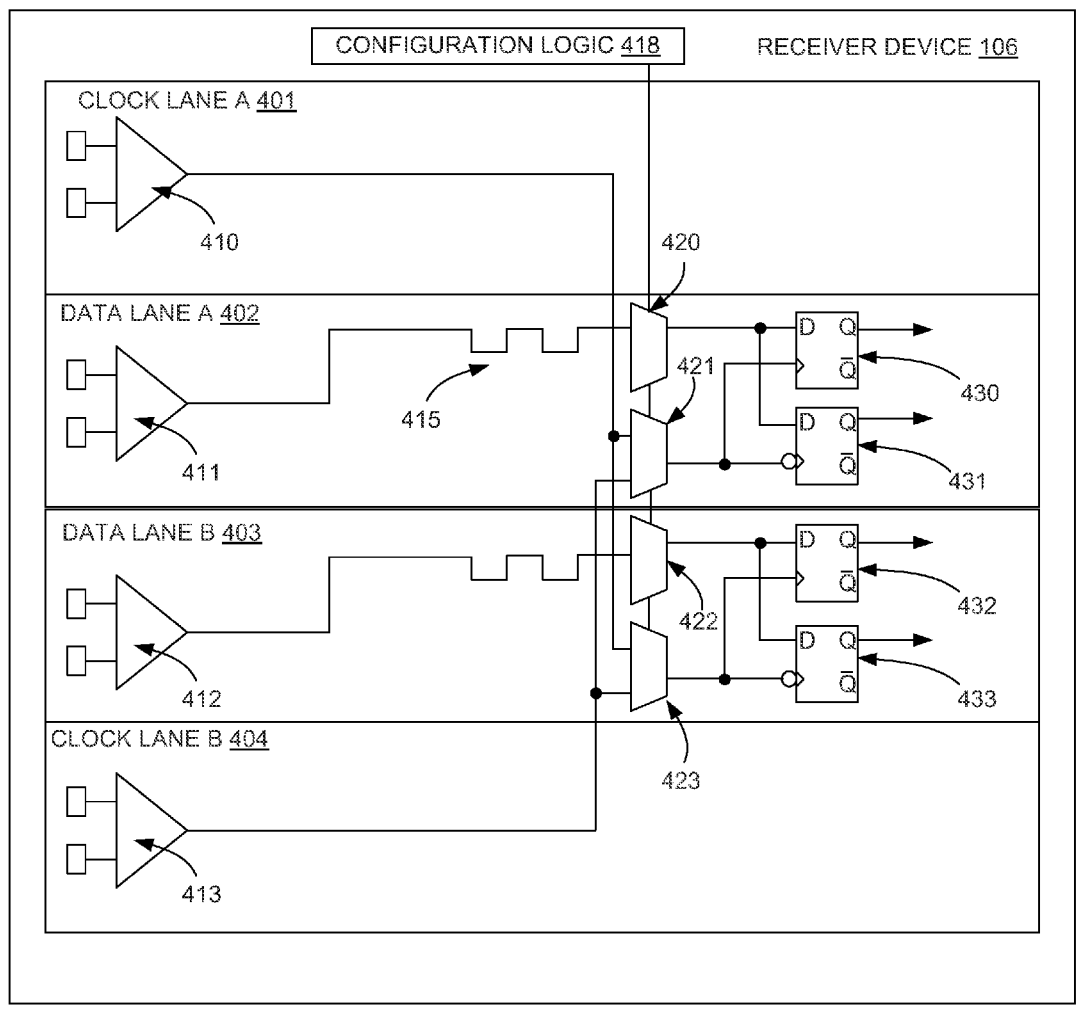
FIG. 4 is a block diagram of an embodiment of a receiver of FIG. 1 having multiple clock lanes and multiple data lanes according to an embodiment of the subject matter disclosed herein.
Figure 5:
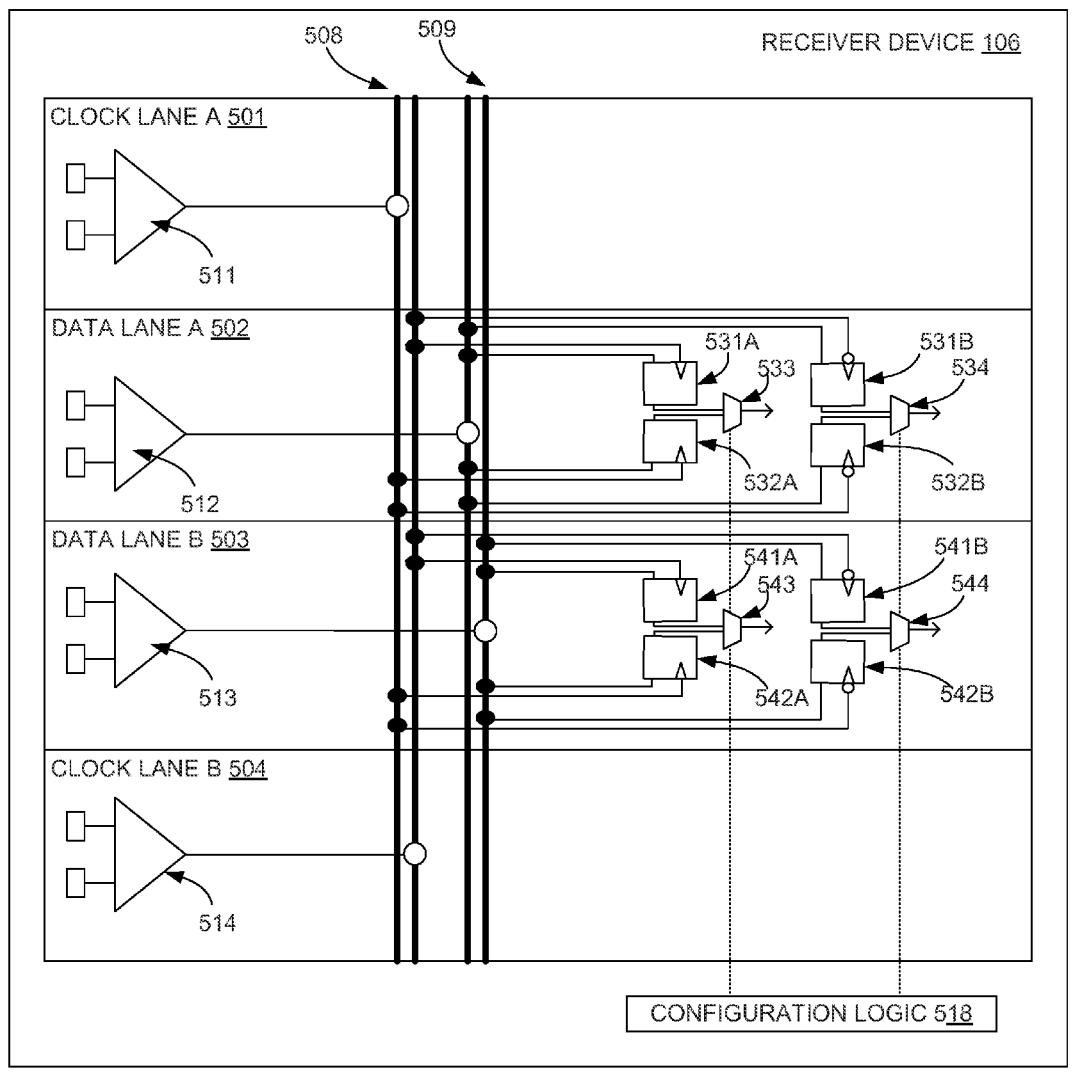
FIG. 5 is a block diagram of an embodiment of a receiver of FIG. 1 having multiple lanes configurable to be clocked by any clock lane according to an embodiment of the subject matter disclosed herein.

In the MIPI DPHY standard having data communication clocked at 1.5 Gbps, the maximum skew allowed between a data signal and a clock signal at the receiver is 133 ps. Thus, the path for the signal may sometimes be referred to a critical path. This critical path includes the propagation time from the moment the clock and data signals enter the transmission line (e.g., just after the line drivers 210 and 211) until the data is latched at the receiver flip-flops 230 and 231. Therefore, any circuitry within this path may impact the skew budget and an aim of the subject matter disclosed herein is to minimize the impact on this critical path in terms of skew. FIG. 4 is an embodiment of a solution that impacts this critical path at least to some degree. FIG. 5 is an embodiment of a solution that impacts the critical path less than the solution of FIG. 4.

FIG. 4 is a block diagram of an embodiment of a receiver of FIG. 1 having multiple clock lanes and multiple data lanes. In this embodiment, the receiver device 106 is shown with two clock lanes A 401 and B 404 as well as two data lanes A 402 and B 403. Each clock and data lane 401-404 includes a respective differential signal receiver driver 410-413 as discussed above with respect to FIG. 2. A skilled artisan understands that the use of two clock lanes and two data lanes is simply for illustrative purposes as any number of clock lanes and any number of data lanes may conceptually be implemented in the receiver device 106.

In any embodiment with more than one clock lane, it may be desirable to clock any given data lane from one and only one clock. However, as the specific clock in which any given data lane is clocked would still be beneficial to be any of the clock lanes, it is also desirable to have a configuration in which all clock lanes be programmable or configurable for clocking any data lane. As such, each clock lane 401 and 404 signal may be coupled to each data lane 402 and 403 via internal circuitry.

In this embodiment, because each clock lane 401 and 404 signal is coupled to each data lane 402 and 403, one clock signal or the other may need to be chosen for operation. Thus, each clock lane 401 and 404 signal is fed to a respective multiplexor 421 and 423. Thus, in data lane A 402, a first multiplexor 421 is placed in the critical path between the clock drivers 410 and 413 and the data latches 430 and 431. A control signal from a configuration logic circuit 418 may then set the multiplexor 421 to select one clock signal or the other for use within this data lane A 402. Similarly, in data lane B 403, a first multiplexor 423 is also placed in the critical path between the clock drivers 410 and 413 and the data latches 432 and 433. Again, a control signal from the configuration logic circuit 418 may set the multiplexor 423 to select one clock signal or the other for use within this data lane B 403. In an embodiment, these multiplexors 421 and 423 are set to be reciprocal of each other in than if data lane A 402 is set to use clock lane A 401, the data lane B 403 will be set to use clock lane B 404. In another embodiment, the multiplexors 421 and 423 can be set in such manner as to allow both data lane A 402 and data lane B 403 to use either clock lane A 401 or clock lane B 404.

With the addition of multiplexors 421 and 423 into the clock signal path, a similar multiplexor is also introduced to the data signal path for each data lane. Thus, data lane A 402 includes a second multiplexor 420 with a single input from the driver 411 for data lane A 402. Likewise, data lane B 403 includes a second multiplexor 422 with a single input from the driver 412 for data lane B 403. These multiplexors 420 and 422 may be referred to as dummy multiplexors as the single input is output regardless of any control signal from the control circuit 418. In this embodiment, the dummy multiplexors 420 and 422 add a time delay equivalent to the time delay introduced by the clock signal multiplexors 421 and 423. Thus, the dummy multiplexors 420 and 422 keep the timing of the clock and data signals somewhat equivalent in terms of delays form components. Then, the output of each dummy multiplexor 420 and 422 is coupled to the D inputs of each data lane's respective pair of data latches (data latches 430 and 431 for data lane A 402 and data latches 432 and 433 for data lane B 403). Each of these D-type flip-flop data latches 430-433 capture data as discussed above with respect to FIG. 2.

There are some disadvantages to the solution of FIG. 4. For example, the addition of the multiplexors 420-423 introduces a time delay into the critical path discussed above. Any impact on the critical path necessarily creates greater timing and precision requirements for all other circuitry and components in the critical path. Additionally, the use of dummy multiplexors introduces circuitry having no effect on the purpose and use of the receiver circuit which leads to unneeded componentry within the critical path Further, serpentine wire traces 415 are typically introduced to balance the length of the signal path from drivers 410-413 to data latches 430-433. With the introduction of multiplexors 420-423, additional serpentine wiring 415 may be needed to balance out all signal paths such that additional skew is not introduced. This also affects the critical path and complicates layout and circuit design.

These and other issues may be overcome by the embodiment described next with respect to FIG. 5.

FIG. 5 is a block diagram of an embodiment of a receiver of FIG. 1 having multiple data lanes that may be configurable to be clocked by any clock lane according to an embodiment of the subject matter disclosed herein. In this embodiment, two data lanes, data lane A 502 and data lane B 503 are used. These data lanes 502 and 503 may be clocked by one of two clock lanes, clock lane A 501 and clock lane B 504. The lanes 501-504 are configurable in that each signal line (from receiver drivers 511-514) may be intersected by a clock bus 508 and a data bus 509 such that the received signals may then be routed to any lane for use as a clock signal Here, clock lane A 501 and clock lane B 504 are configured to provide clock signals for both data lanes 502 and 503. As such, one can see that the signal line from drivers 511 and 514 are coupled to one of the bus lines in the clock bus 508. Further then, one of the bus lines in the clock bus 508 is also coupled to each clock input for each data latch in data lanes 502 and 503. Thus, in data lane A 502, a first set of data latches, 531A/B, are coupled to the bus line of the clock bus 508 corresponding to a signal from clock lane B 504. In this manner, the clock signal from clock lane 504 triggers the data latches 531A/B for data lane A 502. The output of each of these data latches 531A/B is then coupled to first inputs of first multiplexors 533 and 534, respectively. Thus, for these two data latches 531A/B, the multiplexors 533 and 534 may be programmed to select these signals should this data lane A 502 be required to be clocked by clock lane B 504. Then, the actual data signal from data lane A 502 is latched in on the rising edges of the clock signal from clock lane B 504 at the data latch 531A and the falling edges of the clock signal from clock lane B 504 at the data latch 531B.

Similarly, in data lane A 502, a second set of data latches 532A/B, are coupled to the other bus line in the clock bus 508 corresponding to a signal from clock lane A 501. In this manner, the clock signal from clock lane A 501 triggers the data latches 532A/B for data lane A 502. The output of each of these data latches 532A/B is then coupled to second inputs in the respective multiplexors 533 and 534. Thus, for these two data latches 532A/B, the multiplexors 533 and 534 may be programmed to select these signals. Then, the actual data signal from data lane A 502 is latched in on the rising edges of the clock signal from clock lane A 501 at the data latch 532A and the falling edges of the clock signal from clock lane A 501 at the data latch 532B.

In data lane B 503, a similar configuration exists such that data signals from this data lane 503 may be latched at data latches 541A/B and 542A/B according to a respective clock signal from clock lanes 501 and 504. Then multiplexors 543 and 544 may be programmed to pass one set of latched signals or the other as well.

A configuration logic circuit 518 may be used to program the multiplexors 533, 534, 543, and 544 in each data lane according to a desired implementation. Further, because each multiplexor 533, 534, 543, and 544 is on the output side of each data latch, no multiplexor in this embodiment of FIG. 5 falls within the critical path. Thus, any data lane may be clocked from any clock lane without impacting skew budget for the circuit. For example, the embodiment shown in FIG. 5 may be programmed to have data lane A 502 clocked from clock lane A 501 and data lane B clocked from data lane B 504 by setting the multiplexors 533, 534, 543, and 544 as such. This configuration may correspond to a system having two clock signals and two data signals, commonly denoted as 2C2D. However, in other embodiments discussed further any number of data and clock lanes may be present. In this manner, any configuration may be accomplished having n number of clock lanes and m number of data lanes (e.g., nCmD) where any data lane may be clocked from any clock lane.

The configuration logic 518 may comprise configuration data stored in firmware that couples bus lines to lanes through transistor switches. Simple firmware update may then change the configuration of a specific receiver device 106. In other embodiments, the receiver device 106 may be an integrated circuit disposed on one or more circuit dies. Further, the device/IC 106 may be coupled to a processor or include a processor on the chip itself. In some embodiments, the configuration logic may be changed if the device is communicatively coupled (wired or wireless) to a configuration device (not shown).

Figure 6:
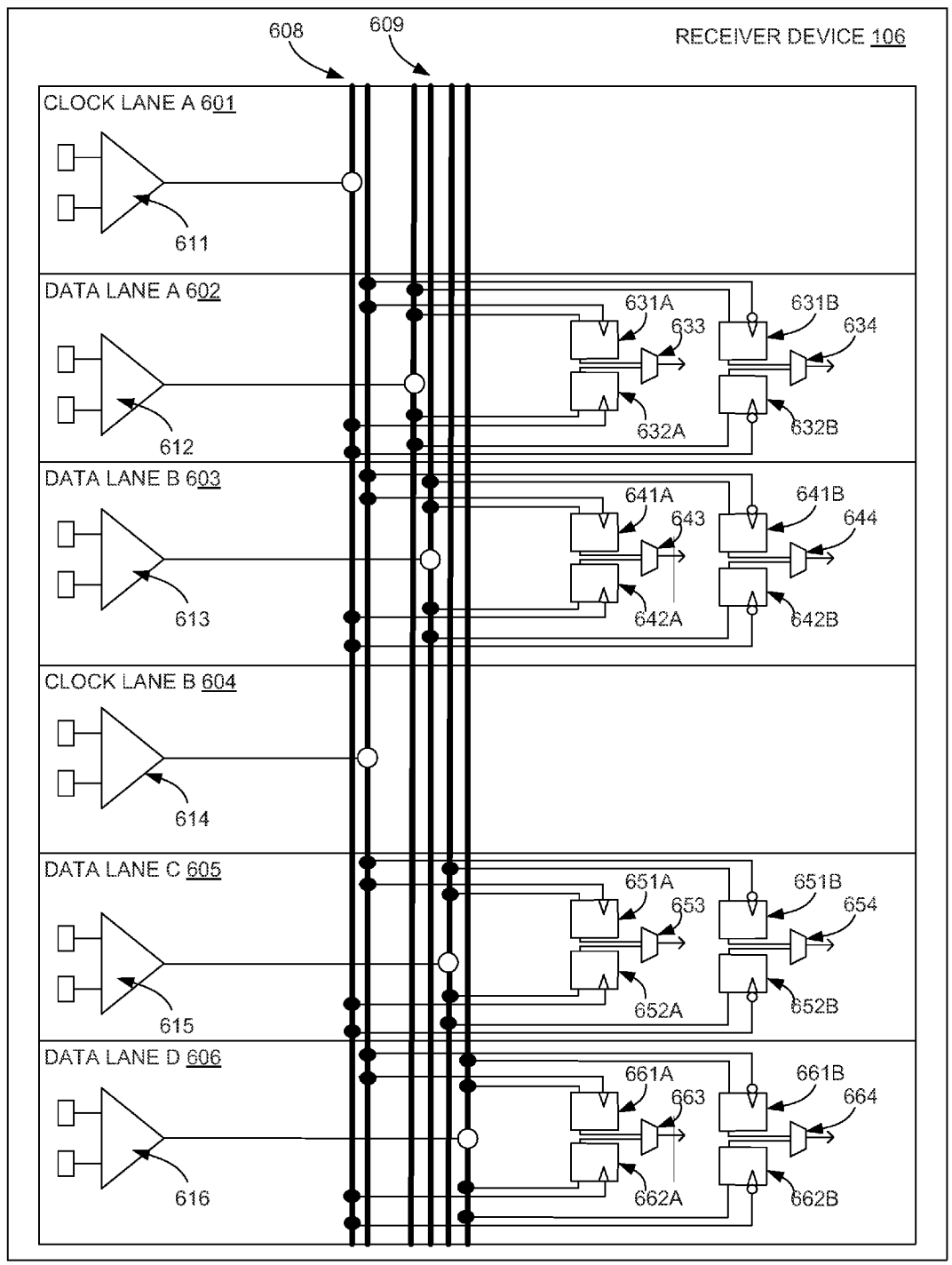
FIG. 6 is a block diagram of another embodiment of a receiver of FIG. 1 having multiple lanes configurable to be clocked by any clock lane according to an embodiment of the subject matter disclosed herein.

FIG. 6 is a block diagram of another embodiment of a receiver of FIG. 1 having multiple data lanes configurable to be clocked by any clock lane according to an embodiment of the subject matter disclosed herein. In this embodiment, four data lanes, data lane A 602, data lane B 603, data lane C 605 and data lane D 606 are used. These data lanes 602, 603, 605 and 606 may be clocked by one of two clock lanes, clock lane A 601 and clock lane B 604. The lanes 601-606 are configurable in that each signal line (from receiver drivers 611-616) may be intersected by a clock bus 608 and a data bus 609 such that the received signals may then be routed to any lane for use as a clock signal.

Here, clock lane A 601 and clock lane B 604 are configured to provide clock signals for all four data lanes 602, 603, 605 and 606. As such, one can see that the signal line from drivers 611 and 614 are coupled to one of the bus lines in the clock bus 608. Further then, one of the bus lines in the clock bus 608 is also coupled to each clock input for each data latch in data lanes 602, 603, 605 and 606. Thus, in data lane A 602, a first set of data latches, 631A/B, are coupled to the bus line of the clock bus 608 corresponding to a signal from clock lane B 604. In this manner, the clock signal from clock lane B 604 triggers the data latches 631A/B for data lane A 602. The output of each of these data latches 631A/B is then coupled to first inputs of first multiplexors 633 and 634, respectively. Thus, for these two data latches 631A/B, the multiplexors 633 and 634 may be programmed to select these signals should this data lane A 602 be required to be clocked by clock lane B 604. Then, the actual data signal from data lane A 602 is latched in on the rising edges of the clock signal from clock lane B 604 at the data latch 631A and the falling edges of the clock signal from clock lane B 604 at the data latch 631B.

Similarly, in data lane A 602, a second set of data latches 632A/B, are coupled to the other bus line in the clock bus 608 corresponding to a signal from clock lane A 601. In this manner, the clock signal from clock lane A 601 triggers the data latches 632A/B for data lane A 602. The output of each of these data latches 632A/B is then coupled to second inputs in the respective multiplexors 633 and 634. Thus, for these two data latches 632A/B, the multiplexors 633 and 634 may be programmed to select these signals. Then, the actual data signal from data lane A 602 is latched in on the rising edges of the clock signal from clock lane A 601 at the data latch 632A and the falling edges of the clock signal from clock lane A 601 at the data latch 632B.

In data lanes B 603, C 605 and D 606, a similar configuration exists such that data signals from these data lanes may be latched at data latches 641A/B and 642A/B, 651A/B and 652A/B, 661A/B and 662A/B, respectively, according to a respective clock signal from clock lanes 601 and 604. Then, multiplexors 643 and 644, 653 and 654, 663 and 664, respectively, may be programmed to pass one set of latched signals or the other as well.

A configuration logic circuit (not shown in this figure for simplicity) may be used to program all multiplexors according to a desired implementation. Further, because each multiplexor is on the output side of each data latch, no multiplexor in this embodiment of FIG. 6 falls within the critical path. Thus, any data lane may be clocked from and clock lane without impacting skew budget for the circuit.

A receiver device 106 manufactured with six total lanes as well as specific numbers of bus lines in the clock bus 608 may have any data lane clocked by any clock lane. A receiver according to FIG. 6 may be denoted as nCmD wherein n and m are at least one. Thus, when denoting lanes from top to bottom in a circuit layout, possible configuration for 2C4D include DDCDDC, DCDDCD, CDDDDC, etc. Of course, a skilled artisan understands that these configurations are for devices with six total lanes; Other devices with a different number of lanes may have different combinations of data lanes and clock lanes.

With such flexibility on configuration after manufacturing, a company may manufacture a single receiver device 106 for multiple customers and configure in the field to suit a customer's need. Common uses by customers may include 1C1D, 1C2D, 1C4D, 2C6D and 2C8D. Each of these configurations may be accomplished with a single receiver device 106 manufactured with ten configurable lanes for clock or data use.

In other embodiments not shown, there may be more than two clock lanes available for being used by any data lane for triggering data latches. In such embodiments then, the clock bus will have an equivalent number of bus lines as the number of clock lanes. Similarly, each data lane will have pairs of data latches for each clock lane in which the data lane may be triggered. Further, the multiplexors in each data lane will also have an equivalent number of inputs from which to choose. Thus, each data lanes in a three clock lane system may include three sets of data latches (one set per clock lane) and two multiplexors having three inputs each.

Such a configurable lane device not only has the advantage of reconfiguration after deployment but also includes circuitry for accomplishing the configurability without affecting the critical signal path between transmitter and receiver data latches. Thus, the skew budget for the receiver device is minimally impacted as compared to other solutions. Thus, this solution may be applied to virtually any source-synchronous receiver system such as the example system discussed with respect to FIG. 7.

Figure 7:
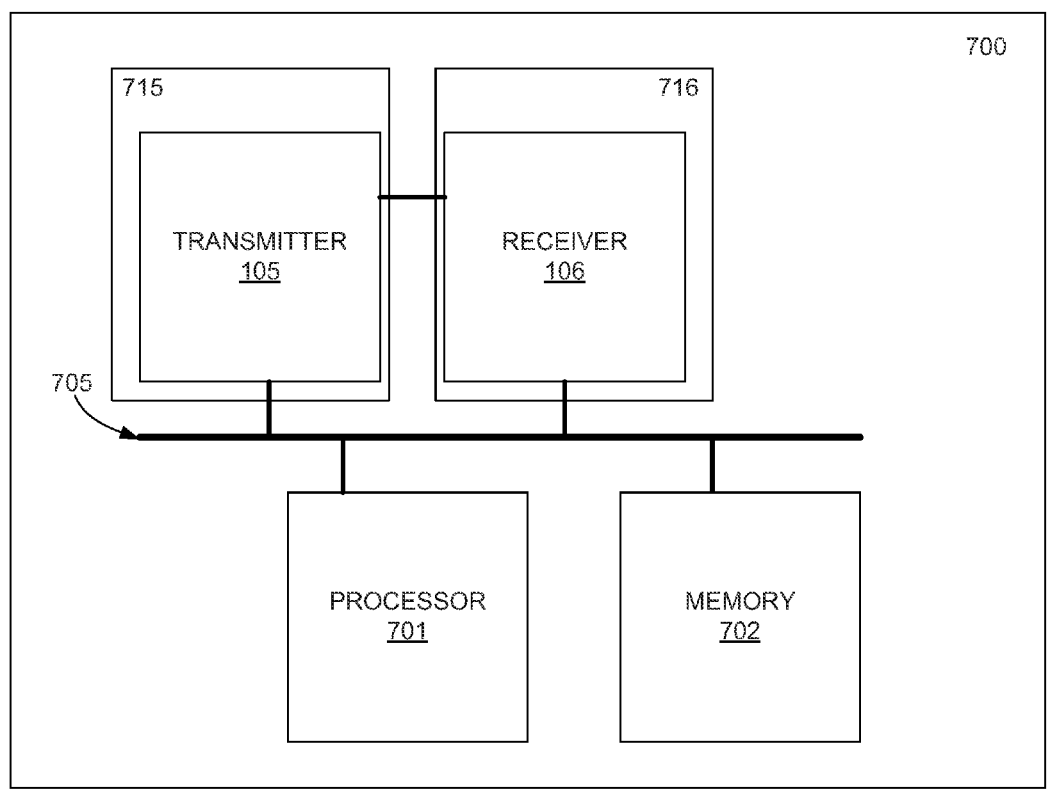
FIG. 7 is a block diagram of an embodiment of a system having the circuit of FIGS. 1-6 lanes according to an embodiment of the subject matter disclosed herein.

FIG. 7 is a block diagram of an embodiment of a system 700 having the circuit of FIGS. 1-6 according to an embodiment of the subject matter disclosed herein. In this system, a transmitter 105 and a receiver 106 are communicatively coupled to each other and to a system bus 705. The system bus may facilitate data and control signals from various components in the system including a processor 701 and memory 702. Further, the transmitter 105 and receiver 106 may disposed within specific system components 715 and 716, respectively.

In one embodiment, the system may be a mobile device such as a smart phone with various components common to a mobile device. Thus, a first component 715 may be an image sensor (e.g., a camera) that senses light and then transmits data about the sensed light via a transmitter 105 to an image processor 716 having a receiver 106. In another embodiment, a first component 715 may be an application processor that reads image data from a memory 702 and then transmits the data via a transmitter 105 to a display 716 having a receiver 106. Other embodiments exist in many other systems 700, such as personal computers, laptop computers, server computers, personal data assistants, palm top computers, etc.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A circuit, comprising:
   a plurality of signal paths configured to receive a plurality of respective source synchronous signals;
   a plurality of signal latch circuits; and
   a configurable bus suited to couple any one of the plurality of signal paths to any one of the plurality of signal latch circuits.

2. The circuit of claim 1, wherein at least one of the plurality of signal paths comprises a clock signal path and wherein at least one of the plurality of the signal paths comprises a data path.

3. The circuit of claim 1, further comprising six signal paths such that four of the six signal paths comprise data signal paths and two of the six signal paths comprise clock signal paths.

4. The circuit of claim 1, wherein at least one of the plurality of signal paths comprises a differential signal path.

5. The circuit of claim 1, wherein each of the signal paths further comprise a receiver driver circuit coupled to a respective signal latch circuit.

6. A circuit, comprising:
   a plurality of signal paths configured to receive a plurality of respective signals;
   a plurality of signal latch circuits; and
   a configurable bus suited to couple any one of the plurality of signal paths to any one of the plurality of signal latch circuits;
   wherein each of the signal latch circuits further comprise:
   a first flip-flop configured to latch a data signal on a rising edge of a first clock signal;
   a second flip-flop configured to latch a data signal on a falling edge of a the clock signal;
   a third flip-flop configured to latch a data signal on a rising edge of a second clock signal;
   a fourth flip-flop configured to latch a data signal on a falling edge of a the second clock signal;
   a first multiplexor having two inputs, a first input coupled to the output of the first flip-flop and a second input coupled to an output of the third flip-flop; and
   a second multiplexor having two inputs, a first input coupled to an output of the second flip-flop and a second input coupled to an output of the fourth flip-flop.

7. The circuit of claim 6, further comprising a configuration logic circuit coupled to the first and second multiplexors, the configuration logic circuit suited to configure the multiplexors for selecting one of the two respective inputs to pass to an output.

8. An integrated circuit, comprising:
   a plurality of lanes, each lane suited to receive one of a plurality of respective source synchronous signals via a respective driver circuit;
   a plurality of signal latch circuits wherein each lane includes at least one signal latch circuit; and a configurable bus suited to couple any one of the driver circuits to any one or more of the plurality of signal latch circuits.

9. The integrated circuit of claim 8 wherein at least one lane is configured as a source synchronous clock lane and wherein the configurable bus is configured to trigger at least one signal latch circuit with a signal received on the source synchronous clock lane.

10. The integrated circuit of claim 8 disposed on a single integrated circuit die.

11. The integrated circuit of claim 8 disposed on multiple integrated circuit dies.

12. A receiver, comprising:
   a data receiver driver suited to receive a source synchronous data signal;
   a first clock receiver driver suited to receive a first source synchronous clock signal;
   a second clock receiver driver suited to receive a second source synchronous clock signal
   a clock signal bus having a first bus line coupled to the first clock receiver driver and a second bus line coupled to the second clock receiver driver
   a plurality of signal latch circuits having respective outputs coupled to at least one selection circuit, at least one latch circuit in the plurality of latch circuit suited to latch a data signal as triggered by the first source synchronous clock signal, and at least one latch circuit in the plurality of latch circuits suited to latch a data signal as triggered by the second source synchronous clock signal; and
   a configuration circuit coupled to each selection circuit, the configuration circuit configured to select either the data signal latched by the first source synchronous clock signal or the data signal latched by the second source synchronous clock signal.

13. The receiver of claim 12, wherein the configuration circuit comprises firmware stored in a memory.

14. The receiver of claim 12, wherein the source synchronous data signal is latched by a signal latch circuit within 50 picoseconds of being received by the data receiver driver.

15. A system; comprising:
   a processor;
   a transmitter circuit coupled to the processor and configured to transmit data signals and clock signals; and
   a receiver circuit coupled to the processor and coupled to the transmitter and configured to receive the transmitted clock signals and the transmitted data signals, the receiver further comprising:
   at least one data receiver driver suited to receive at least one data signal;
   at least two clock receiver drivers suited to receive at least one first clock signal and at least one second clock signal, respectively;
   a first data latch circuit configured to latch the at least one data signal in conjunction with the first clock signal; and
   a second data latch circuit configured to latch the at least one data signal in conjunction with the second clock signal
   a configuration circuit coupled to the first and second latch circuits and configured to select the latched data signal as latched by either the first or second clock signal.

16. The system of claim 15, further comprising a mobile device wherein the transmitter circuit comprises a camera and the receiver circuit comprises an image processing device.

17. A method, comprising:
   receiving a first clock signal from a source synchronous transmitter;
   receiving a second clock signal from a source synchronous transmitter receiving a data signal from the source synchronous transmitter;
   latching the data signal with the first clock signal at a data latch circuit; and
   latching the data signal with the second clock signal at the data latch circuit.

18. A method, comprising:
   receiving a plurality of clock signals from a source synchronous transmitter;
   receiving a plurality of data signals from the source synchronous transmitter;
   configuring a clock signal bus to route each of the plurality of clock signals to each of a plurality of data latch circuits.

19. The method of claim 18, wherein the routing does not impact a skew budget.

* * * * *